March 13, 1928.
J. L. HOSFORD
1,662,643
GEAR SHIFTING LEVER LOCK
Filed Dec. 17, 1926
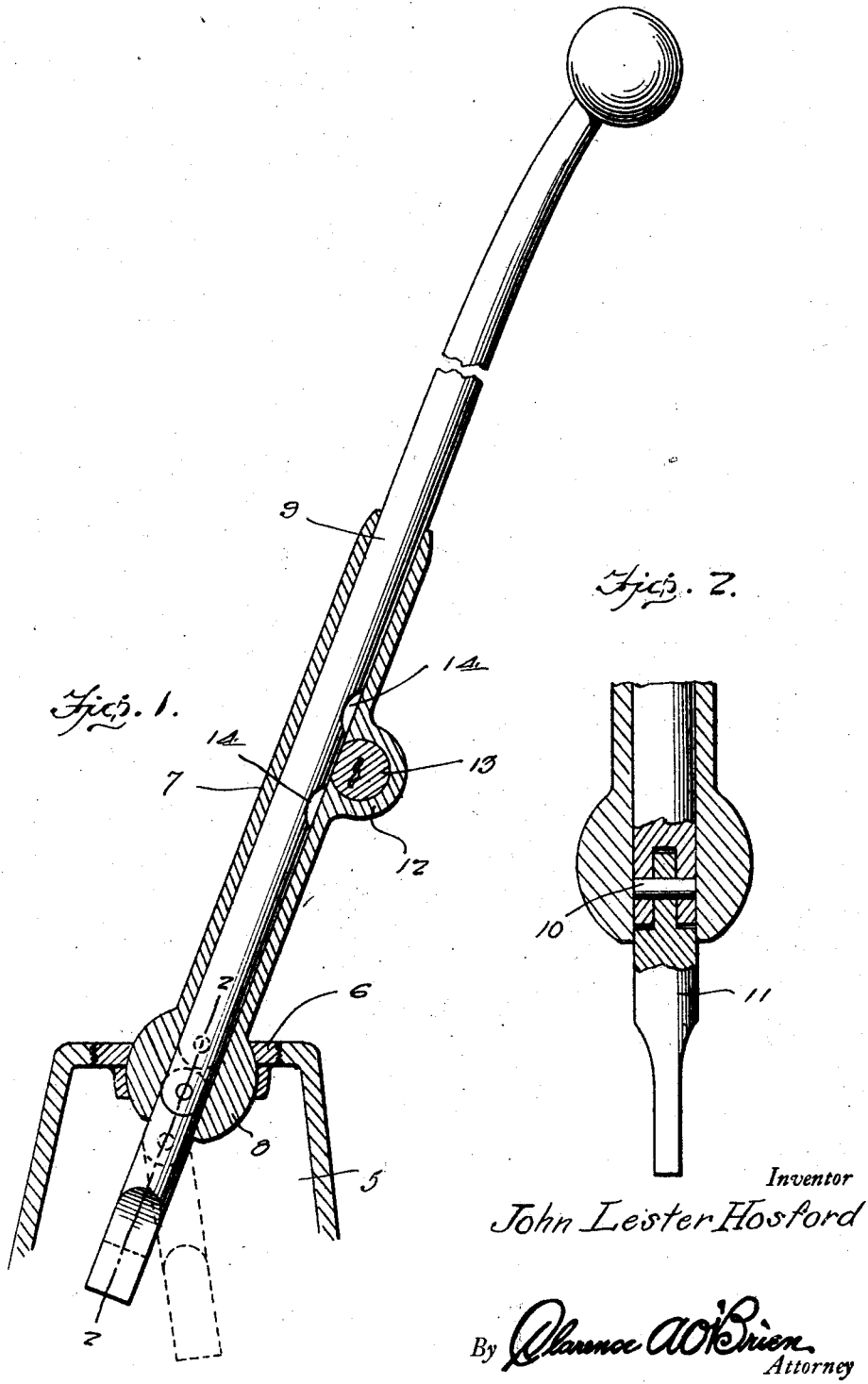
Inventor
John Lester Hosford
By *Clarence A. O'Brien*
Attorney Patented Mar. 13, 1928.

1,662,643

UNITED STATES PATENT OFFICE.

JOHN LESTER HOSFORD, OF BOONVILLE, MISSOURI.

GEAR-SHIFTING-LEVER LOCK.

Application filed December 17, 1926. Serial No. 155,450.

This invention relates to a gear shifting lever lock and has for its primary object to substantially improve and simplify the character of device shown and described in Patent #1,609,820 granted to me December 7, 1926.

In the lock device disclosed in said aforesaid patent it is necessary that the shifting lever be entirely removed from the shifting mechanism of the engine transmission, after which the lever is locked in such a position. It is disadvantageous to a certain extent by reason of the fact that it is frequently difficult to again engage the lever with the shifting mechanism of said transmission.

The invention therefore aims to provide such a shifting lever lock wherein the shifting lever need not be entirely disconnected with the shifting mechanism of the transmission and wherein even though such a disconnection is not present, it will be impossible to shift the gears even though the lever may be moved in the usual positions.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate similar parts in both of the views:

Figure 1 is a detail vertical section through my improved locking mechanism, the shifting lever for the transmission being shown in side elevation, and Figure 2 is an enlarged fragmentary longitudinal section taken substantially upon the line 2—2 of Figure 1.

Now having particular reference to the drawing, 5 designates the usual ball joint housing of a transmission mechanism, the top wall of which in the present instance is formed with a threaded opening for receiving a plug plate 6, the center of which is formed with a circular opening of rounded formation at its edge.

My invention consists of a relatively elongated sleeve 7 formed at its lower end with a ball shaped head 8 for universal movement within the opening of the plug plate 6, and within which is longitudinally slidable a shifting lever 9. Upon the inner end of this lever there is pivotally secured as at 10 a short extension 11 shaped at its lower end in such a manner as to engage with the shifting mechanism of the engine transmission, not shown. This extension 10 is further of such a character as to be engaged with the shifting mechanism of the transmission even though the shifting lever 9 is moved inwardly of the sleeve 7 so that the joint between the lever and the extension will be broken or when the same is moved rearwardly in the sleeve so as to rigidly interconnect the lever and its sections 9 and 11 respectively.

The back side of the sleeve 7 as in my prior patent is provided with a cylinder lock casing 12 within which is a key controlled locking barrel 13 for engagement within either one of a pair of spaced arcuate shaped notches 14—14 in the adjacent surface of the shifting lever 9, this construction being identical with the construction shown and described in my prior patent, and therefore a detailed description is not believed necessary.

Obviously when the barrel 13 is turned to the position indicated in Figure 1 the lever 9 may be moved inwardly or outwardly through the sleeve 7. When moved inwardly, the joint between the lever and the extension will project through the sleeve so that the extension will be free to swing upon the lever with the result that it will be impossible to shift the gears of the transmission. However, when the lever is drawn outwardly, the joint will be within the sleeve so that the extension will be rigidly associated with the lever with the result that the gears may be properly shifted.

It will thus be seen that I have substantially improved and simplified the gear shifting lever lock mechanism shown and described in my previously mentioned copending application and even though I have herein shown and described the present invention as consisting of certain detail structural elements it is nevertheless to be understood that some changes may be made therein without affecting the spirit and scope of the appended claims.

Having thus described the invention, what I claim is:—

1. In a transmission shifting lever lock, an elongated sleeve universally mounted at one end in the transmission case, a shifting lever slidable in the sleeve, an extension pivoted to the inner end of the lever and adapted for engagement with the shifting mechanism of the transmission, said extension being rigidly connected to the lever when the same is moved partially within the sleeve so as to facilitate the shifting of the gears, said extension being free to swing with respect to the lever when the same is moved entirely out of the sleeve, for preventing the shifting of the gears and means whereby the lever may be rigidly locked in either position.

2. In a transmission shifting lever lock, an elongated sleeve universally attached at one end to the transmission case, a shifting lever slidable in the sleeve, an extension pivoted to the inner end of the lever and adapted for engagement with the shifting mechanism of the transmission, said member having rigid engagement with the lever when the same is slid outwardly to partially engage the member within the sleeve, said member being loose upon the member when the same is moved inwardly of the sleeve, and means whereby the lever may be rigidly secured in either position.

3. In a transmission shifting lever lock, a lever universally connected to the transmission case, and slidable longitudinally with respect thereto, a member pivoted to the inner end of the lever for engagement with the shifting mechanism of the transmission, and means whereby the member may be rigidly connected to the lever so as to facilitate the shifting of the gears, said means being further operable to permit the member to swing upon the lever so that the gears cannot be shifted during the shifting of the lever.

4. In a transmission shifting lever lock, a lever universally connected to the transmission case, and slidable longitudinally with respect thereto, a member pivoted to the inner end of the lever for engagement with the shifting mechanism of the transmission, and means whereby the member may be rigidly connected to the lever so as to facilitate the shifting of the gears, said means being further operable to permit the member to swing upon the lever so that the gears cannot be shifted during the shifting of the lever, and means for positively locking the member in either position.

In testimony whereof I affix my signature.

JOHN LESTER HOSFORD.